United States Patent
de Folter et al.

(10) Patent No.: US 12,096,783 B2
(45) Date of Patent: Sep. 24, 2024

(54) EMULSIFIED FOOD COMPOSITION

(71) Applicant: Conopco Inc., Englewood Cliffs, NJ (US)

(72) Inventors: Julius Wouter Johannes de Folter, Vlaardingen (NL); Sabrina Silva Paes, Wageningen (NL); Petrus Wilhelmus N de Groot, Vlaardingen (NL); Stephan Georg Schumm, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 724 days.

(21) Appl. No.: 17/291,645

(22) PCT Filed: Oct. 24, 2019

(86) PCT No.: PCT/EP2019/079014
§ 371 (c)(1),
(2) Date: May 6, 2021

(87) PCT Pub. No.: WO2020/099092
PCT Pub. Date: May 22, 2020

(65) Prior Publication Data
US 2021/0401015 A1  Dec. 30, 2021

(30) Foreign Application Priority Data
Nov. 13, 2018 (EP) .................................... 18205812

(51) Int. Cl.
A23L 29/10 (2016.01)
A23L 27/00 (2016.01)
A23L 27/60 (2016.01)
A23L 29/219 (2016.01)

(52) U.S. Cl.
CPC ............... *A23L 29/10* (2016.08); *A23L 27/60* (2016.08); *A23L 27/80* (2016.08); *A23L 29/219* (2016.08)

(58) Field of Classification Search
CPC ........ A23L 29/10; A23L 29/219; A23L 27/60; A23L 27/80
See application file for complete search history.

(56) References Cited

U.S. PATENT DOCUMENTS

| | | | |
|---|---|---|---|
| 3,425,843 A | 2/1969 | Japikse | |
| 4,626,444 A | 12/1986 | Takahashi et al. | |
| 5,654,029 A | 8/1997 | Heeringa et al. | |
| 2009/0317509 A1 | 12/2009 | Golding et al. | |
| 2010/0233221 A1 | 9/2010 | Folmer et al. | |
| 2015/0298084 A1 | 10/2015 | Schoeppe et al. | |
| 2017/0112173 A1* | 4/2017 | Beri | A23L 35/10 |
| 2018/0049456 A1* | 2/2018 | Gehin-Delval | A23P 30/40 |
| 2018/0055065 A1 | 3/2018 | Schoeppe et al. | |
| 2018/0103654 A1* | 4/2018 | Smith | A23G 3/40 |

FOREIGN PATENT DOCUMENTS

| | | |
|---|---|---|
| CL | 202101236 | 10/2021 |
| CL | 2021001237 | 10/2021 |
| CL | 2021001238 | 10/2021 |
| EP | 0997075 | 10/1999 |
| EP | 2054776 | 5/2009 |
| WO | WO0105241 | 1/2001 |
| WO | 03/049548 | 6/2003 |
| WO | 03/049553 | 6/2003 |
| WO | 2009/003960 | 1/2009 |
| WO | 2011/077073 | 6/2011 |
| WO | 2012/082065 | 6/2012 |
| WO | WO2017136238 | 8/2017 |

OTHER PUBLICATIONS

Ali Marefati et al; Fabrication of encapsulated oil powders from starch granule stabilized W/O/W Pickering emulsions by freeze-drying—ScienceDirect; Food Hydrocolloids 2015 pp. 261-271; Jan. 1, 2015; pp. 261-271.
Agama;Current Opinion in food Science;vol. 13;pp. 78-83;2017; 2017; 78-83; 13.
Muschiolik;Multiple emulsions for food use;Colloid Interface Science;vol. 12;Issue 4-5;pp. 213-220;2017; 2017; 213-220; 12.
Adel;Fat Crystallite Thickness Distribution Based on SAXD;Eur J Lipd Aci Technol;V. 120;pp. 1-21;2018; 2018; 1-21; 12.
Silva Roberta Claro Da et al: "Microscopic approach of the crystallization of tripalmitin and tristearin by microscopy", Chemistry and Physics of Lipids, Limerick, IR, vol. 198, Apr. 14, 2016 (Apr. 14, 2016), pp. 1-9.
N. . Garti et al: "Double emulsions of water-in-oil-in-water stabilized by [alpha]-form fat microcrystals. Part 1: Selection of emulsifiers and fat microcrystalline particles", Journal of the American Oil Chemists' Society (JAOCS), vol. 76, No. 3, 1999, pp. 383-389.
Tavernier Iris et al: "Food-grade particles for emulsion stabilization", Trends in Food Science and Technology, vol. 50, 2016, pp. 159-174.

(Continued)

Primary Examiner — Anthony J Weier
(74) Attorney, Agent, or Firm — N.V. Nederlandsch Octrooibureau

(57) ABSTRACT

A food composition in the form of a water-in-oil-in-water emulsion, the food composition comprising water, an oil phase comprising vegetable oil and fat crystals, and an oil-in-water emulsifier, and a process for preparing the same.

15 Claims, No Drawings

(56) References Cited

OTHER PUBLICATIONS

Garti N et al: "Stabilization of water-in-oil emulsions by submicrocrystaline alpha-form fat particles", Journal of the American Oil Chemists' Society (JAOCS), Springer, DE, vol. 75, No. 12, 1998, pp. 1825-1831.
Marefati et al: "Fabrication of encapsulated oil powders from starch granule stabilized W/O/W Pickering emulsions by freeze-drying", Food Hydrocolloids, vol. 51, Oct. 2015, pp. 261-271.
Ghosh et al: "Fat crystals and water-in-oil emulsion stability", Current Opinion in Colloid & Interface Science, vol. 16, 2011, pp. 421-431.
Macierzanka et al: "Effect of crystalline emulsifier composition on structural transformations of water-in-oil emulsions: Emulsification and quiescent conditions", Colloids and Surfaces A: Physicochemical and Engineering Aspects, vol. 334, 2009, pp. 40-52.

\* cited by examiner

EMULSIFIED FOOD COMPOSITION

The present invention relates to an emulsified food composition, in particular in the form of a water-in-oil-in-water emulsion. It further relates to a method for making such a food composition.

BACKGROUND OF THE INVENTION

Emulsified food compositions are known, and typical examples are dressings or sauces such as mayonnaise and salad dressing. Such emulsions typically are oil-in-water emulsions, wherein a water-continuous phase comprises droplets of oil that are emulsified in the water phase. To ensure a stable emulsion over time, an emulsifier is added. In mayonnaise compositions, traditionally the characteristic emulsifier comprises egg yolk.

Oil-in-water emulsified food products can comprise a high percentage of oil for "full fat" mayonnaises. For these products an oil level of around 65-80 wt % is typical. There is a desire of consumers to have such compositions prepared with a lower level of oil. Lower oil emulsified food products are known. Taste and organoleptic properties are however preferably similar to those experienced with "full fat" compositions. A solution found in the art is the use of double emulsions.

A double emulsion, in this context is a water-continuous emulsion that comprises droplets of a water-in-oil emulsion. When using double emulsions, the consumer can experience an oil-in-water composition with equivalent amount of oil droplets. For a double emulsion, since the oil droplets contain water, the total oil level is less, whereas the perception is that of a composition with equivalent amount of oil droplets. Such emulsions are conveniently prepared by first preparing a primary emulsion with the use of a primary emulsifier, the water-in-oil emulsifier. The primary emulsion is emulsified in a water phase with the use of a secondary emulsifier. A primary emulsifier that is known to provide stable water-in-oil-in-water emulsions is polyglycerol polyricinoleate (PGPR), E476, an emulsifier made from glycerol and fatty acids (usually from castor bean). The secondary emulsifier normally is derived from egg, such as for example egg yolk. Egg yolk is the emulsifier traditionally associated with mayonnaise manufacturing PGPR, E476, is a synthetic chemical compound. PGPR is a known lipophilic emulsifier that is food grade and capable to stabilize water droplets in oil. However, its use has become an area of debate. There is a desire from consumers to have food products as much as possible free from compounds that are considered 'artificial' or 'chemical'.

WO2011/077073 relates to double emulsions, and discloses a process to prepare a double emulsion wherein crystalline mono- and triglycerides are used to stabilize the primary emulsion. A primary water-in-oil emulsion is prepared by heating the mixture of water, oil and mono- and triglycerides, followed by cooling which allows the mono- and triglycerides to solidify at the interphase of the water and the oil. Nevertheless, triglyceride crystals will be formed in the oil phase, affecting the stability of the emulsion. The formed water-in-oil emulsion is then diluted with oil to decrease the concentration of fat crystals in the oil phase to increase stability and the water-in-oil emulsion is mixed with water to form a water-in-oil-in-water emulsion.

The remaining disadvantage of this process and resulting emulsion is that it is very inefficient in terms of process steps and energy use in an industrial context, as it requires heating of the internal water phase and the oil phase including the primary emulsifiers to allow primary emulsification at high temperature, followed by cooling in a votator apparatus and a subsequent extra dilution step with oil to result in the primary emulsion. This primary emulsion is then emulsified with water to prepare a water-in-oil-in-water emulsion which is stabilized with a secondary emulsifier. Another disadvantage is the use of monoglyceride or another additional primary emulsifier which is not desired as it is a non-natural ingredient and/or requires an additional label declaration. The level of fat crystals in WO'073 is limited to facilitate the second emulsification step and to prevent instability of the secondary emulsion.

US2010/0233221 relates to double emulsions which are organoleptically similar to full fat emulsions and are stabilized by a selection of emulsifiers. The object of this document is to provide stabilized double emulsions. The disclosed compositions rely on the presence of two primary emulsifiers, mostly comprising PGPR and two secondary emulsifiers. In the context of the present invention, we consider the use of several emulsifiers, mostly including PGPR as not efficient and undesired.

Accordingly, there is still a desire for a stable emulsified food product with a relatively low fat content while providing the experience of a higher fat product, which has good stability while not relying on multiple emulsifiers, and which does not depend on added monoglycerides, preferably is free from added monoglycerides, or on the presence of PGPR, preferably is free from PGPR. There is a desire for a process to produce water-in-oil-in-water emulsions that do not require PGPR and monoglycerides and which is efficient in energy use and process steps.

SUMMARY OF THE INVENTION

Surprisingly this objective was achieved, at least partly, by the composition and process according to the invention. Accordingly, in a first aspect the present invention relates to a food composition in the form of a water-in-oil-in-water emulsion, the food composition comprising:
  Water,
  An oil phase comprising
    Vegetable oil,
    Water-in-oil emulsifier consisting of fat crystals,
  Oil-in-water emulsifier,
wherein the composition comprises less than 0.2 wt % monoglycerides based on the oil phase.

In a further aspect the invention relates to a process to manufacture the composition according to any one of the preceding claims, the process comprising the steps of:
  a) Providing an oil phase (O) comprising vegetable oil and water-in-oil emulsifier consisting of fat crystals dispersed therein,
  b) Combining the oil phase from step a) with water to form a primary water-in-oil emulsion (W1/O),
  c) Combining the primary water-in-oil emulsion from step b) with a secondary water phase (W2) comprising water and oil-in-water emulsifier to form a water-in-oil-in-water emulsion (W1/O/W2).

DETAILED DESCRIPTION OF THE INVENTION

Emulsified Food Product

In a first aspect, the invention relates to a composition in the form of a water-in-oil-in-water (W1/O/W2) emulsion, also referred to here as 'double emulsion'. Such compositions are known in the art and used for example to reduce the total oil level of the composition. The emulsion comprises droplets of a water-in-oil emulsion that are formed from an inner water phase (W1), an oil phase (O) comprising vegetable oil and fat crystals and a primary emulsifier. The water-in-oil emulsion is emulsified in an external water phase (W2) with the use of a secondary emulsifier. It is a long-standing problem to provide an edible W1/O/W2 emulsion that is stable over time, e.g. more than 6 months. The stability is affected by coalescence of the internal water phase, which may result in coalescence of the W1 with the W2 phase. Such a loss of internal water phase W1 will lead to loss in firmness and ultimately phase separation and creaming.

The composition of the invention is preferably a mayonnaise type emulsion or a salad dressing, preferably a mayonnaise-type dressing. Such emulsions are well-known. In the context of the invention, these definitions are not limited to regulatory definitions of particular countries e.g. mayonnaise in terms of prescribed levels of oil, water, egg yolk or mustard. It includes products such as for example light mayonnaise, vegan mayonnaise etc., i.e. with a similar appearance and organoleptic perception but deviating levels or types of ingredients. A specific texture, such as a viscosity, is often recognized by consumers as mayonnaise-like dressing.

Oil Phase (O)

The oil phase according to the invention comprises vegetable oil and fat crystals. Oil phase refers to the total amount of oil in the composition of the invention and includes liquid vegetable oil at 20° C. and fat crystals (solid fat at 20° C.).

Preferably, the oil phase is present in an amount of between 5 and 76 wt %, more preferably of between 8 and 69 wt %, even more preferably of between 10 and 47 wt %, based on the weight of the composition.

Vegetable Oil

Accordingly, the food product of the present invention comprises vegetable oil. Preferably the oil is present in an amount of from 5 to 70 wt %, more preferably of from 5 to 65 wt %, even more preferably of from 5 to 50 wt %, most preferably of from 5 to 45 wt %, based on the weight of the composition.

Vegetable oil is preferably present in an amount of less than 70 wt %, more preferably less than 65 wt %, even more preferably less than 50 wt %, even more preferably less than 45 wt %.

It is preferably present in an amount of more than 5 wt %, more preferably of more than 8 wt %, even more preferably more than 10 wt %, more preferably of more than 12 wt %, based on the weight of the composition. It may be preferred, that oil is present in an amount of from 5 to 70 wt %, more preferably of from 5 to 65 wt %, even more preferably from 5 to 50 wt %, more preferably of from 5 to 45 wt %, based on the weight of the composition. But also ranges combined of the previous end points may be preferred, and an amount of from 5 wt % to 65 wt %, or from 8 to 50 wt %, or from 10 to 45 wt % or from 12 to 40 wt % may be preferred.

The vegetable oil that can be used in the present invention can be the edible oils conventionally used in the preparation of food emulsions. Suitable vegetable oils for the present invention are predominately composed of triglycerides. The triglyceride mixture present in the vegetable oil will preferably not crystallise at temperatures above room temperature (20° C.) preferably they will not crystallise at temperatures above 5° C. The vegetable oil is liquid at room temperature (20° C.), more preferably, the oil is liquid at 5° C. The vegetable oil is preferably chosen from soybean oil, sunflower oil, canola oil, rapeseed oil, olive oil and mixtures thereof. The fat crystals as feature of the present invention are not calculated as part of the feature "vegetable oil". The fat crystals are part of the oil phase.

The present invention comprises an oil phase, wherein the oil phase contains emulsified water (not part of the oil phase) to form the W1/O emulsion. The total amount of water-in-oil emulsion (W1/O) droplets is preferably of from 5 to 78 wt %, more preferably of from 7 to 70 wt %, even more preferably of from 10 to 65 wt % based on the weight of the food composition of the invention. It may be preferred, that the total amount of the water-in-oil emulsion droplets is preferably of from 10 to 78 wt %, more preferably of from 15 to 70 wt %, even more preferably of from 20 to 65 wt % based on the weight of the food composition of the invention.

Fat Crystals

According to the invention, the composition comprises a water-in-oil emulsifier consisting of fat crystals. Fat crystals function as the emulsifier of the W1 phase in the oil phase. The inventors are not aware of a food composition in the form of a water-in-oil-in-water emulsion which uses only fat crystals as water-in-oil emulsifier, while not depending on monoglycerides, which showed good phase-stability over time. When using the process and the composition of the invention, this objective was achieved.

Fats (hardstock) that appeared suitable for fat crystals in the context of the present invention are triglycerides or mixtures of triglycerides that crystallize at a temperature of between 58 and 72° C., preferably of between 60 and 70° C. Preferably, the fat crystals are present in solid form in the food composition at a temperature of normal use of the food composition, preferably at a temperature of between 5 and 40° C., more preferably 10 and 35° C., most preferably at 30° C. It was found to be especially preferable if said fats crystallize in the form of platelets. This can be for example obtained from fully hydrogenated vegetable oils more preferably from fully hydrogenated rapeseed oil or high erucic rapeseed oil. The fat crystals therefore preferably comprise, more preferably consist of, fully hydrogenated vegetable oil.

Hardstock fat to produce the fat crystals according to the present invention are selected from the group consisting of hardened sunflower seed oil, soybean oil, cotton seed oil, palm oil or rapeseed oil, and mixtures thereof. Preferably, the fat crystals comprise hardened rapeseed oil. Even more preferably, the fat crystals comprise, more preferably consist of, fully hydrogenated oil, more preferably comprise, even more preferably consist of fully hydrogenated rapeseed (RP70) oil or high erucic rapeseed oil (RPh70). These fats provided optimal results in the context of the invention. Fully hydrogenated high erucic rapeseed oil is a well known hardstock fat which complies with the requirements for this invention.

As the skilled person will appreciate, the crystals of the present invention are sufficiently small so that they can cover the water droplets of the primary W1/O emulsion. This type of emulsification is known in the art as pickering. As known to a person skilled in the art, crystal size can be estimated by small angel X-ray scattering (SAXS), which allows to measure the average crystal thickness of fat crystals. (Ruud den Adel, Kees van Malssen, John van Duynhoven, Oleksandr O. Mykhaylyk, and Adrian Voda, "Fat Crystallite Thickness Distribution Based on SAXD", Peak Shape Analysis, Eur. J. Lipid Sci. Technol. 2018, 120, 1800222). The average crystal thickness (smallest dimension, as understood in the art) of crystals according to the present invention is preferably less than 100 nm more preferably less than 80 nm, more preferably less than 60 nm and even more preferably less than 40 nm (as measured in the final food product).

Apart from fat crystals, one or more other lipophilic emulsifiers may be present, although that is not necessary to provide a stable double emulsion. According to the invention, the amount of monoglycerides is less than 0.2 w %, preferably less than 0.1 wt %, based on the weight of the oil phase. Preferably, the amount of monoglycerides is less than 0.05 w %, preferably less than 0.03 wt %, based on the weight of the composition. Preferably the composition is free from monoglycerides. The amount of other W1/O emulsifiers, i.e. other than the fat crystals, is preferably less than 0.2 wt %, more preferably less than 0.1 wt % based on the weight of the composition. It could be preferred that no additional W1/O emulsifier is present in the composition. Specifically, the amount of PGPR is preferably less than 0.2 wt %, more preferably less than 0.1 wt % based on the weight of the composition. Most preferably the composition is free from PGPR. It is preferred that the use of artificial ingredients, possibly requiring additional E-numbering on the label, is as little as possible. Additional ingredients requiring E-number labeling are preferably absent. Therefore, glycerol monooleate or amidated low methoxylpectin is also not desired and preferably absent from the composition. It could be preferred that the fat crystals comprising triglycerides are the only compound added as primary emulsifier. Hence, it can be preferred, that the composition comprises water-in-oil emulsifier, wherein the water-in oil emulsifier consists of fat crystals.

The amount of fat crystal is preferably of from 0.1 to 6 wt %, more preferably of from 0.2 to 3.5 wt %, most preferably of from 0.25 to 3 wt %, based on the weight of the composition. It may be preferred that the amount of fat crystals is from 0.5 to 15%, more preferably of from 1 to 12 wt %, more preferably of from 2 to 10 wt %, even more preferably of from 2.8 to 7 wt %, most preferably of from 3 to 6 wt % based on the weight of the oil phase. The skilled person will understand that the amount of water-in-oil emulsifier should be adjusted to the amount of water to be emulsified.

It may be preferred that the food composition also contains flavoring and coloring materials which are oil soluble and therefore are comprised in the oil phase.

Water

The total amount of water in the food composition is preferably of from 25 to 95 wt %, more preferably of 30 from 90 wt %, more preferably of 35 from 87 wt % and most preferably of from 45 to 85 wt %, based on the weight of the composition.

It is in particular preferred, that the primary water phase W1, which is the water inside of water-in-oil emulsion droplets, is present in an amount of more than 25 wt %, preferably more than 30 wt %, preferably more than 35 wt %, even more preferably more than 38 wt %, based on the weight of the primary emulsion (water-in-oil emulsion, W1/O). The amount of the water phase W1, based on the weight of the primary emulsion (W1/O) is preferably less than 70 wt %, more preferably less than 65 wt %, even more preferably less than 60 wt %, based on the weight of the primary emulsion (W1/O). The amount of the water phase W1, based on the weight of the primary emulsion (W1/O) is preferably of from 25 to 60 wt %, more preferably of from 30 to 55 wt %, more preferably of from 35 to 50 wt %, even more preferably of from 38 to 45 wt %, based on the weight of the primary emulsion (W1/O).

The continuous water phase (W2), also called secondary water phase, is preferably present in an amount of from 20 to 95 wt %, more preferably of from 22 to 90 wt %, more preferably of from 25 to 85 wt %, more preferably of from 30 to 80 wt %, and most preferably of from 25 to 75 wt % of the weight of the total composition. It may be preferred, that the continuous water phase (W2), is preferably present in an amount of from 20 to 75 wt %, more preferably of from 22 to 70 wt %, even more preferably of from 25 to 60 wt % based on the weight of the food composition of the invention.

Oil-in-Water Emulsifier (Secondary Emulsifier)

In the present invention it was found that fat crystals provide a food-grade alternative as lipophilic water-in-oil emulsifier which is strong enough to maintain emulsion stability over time, and does not rely on the presence of another primary emulsifier. For the overall stability for a W1/O/W2 the choice of secondary emulsifier is also of importance.

Preferred secondary emulsifiers could be OSA-modified starch, whey protein, legume flour, plant protein and mixtures thereof. It is preferred that the secondary emulsifier is not from animal origin. In this respect, more preferably the secondary emulsifier comprises plant protein, even more preferably is selected from the group consisting of OSA-modified starch, legume flour, plant protein and mixtures thereof.

In the context of the invention, OSA-modified starch is most preferred, because it showed an optimal result in stability, appearance and texture, compared to other secondary emulsifiers. It was found that by using OSA-modified starch stable double-emulsions could be prepared when using fat crystals as primary emulsifier, even when the fat crystals are used at a relatively high concentration. OSA modified starch is known in the art and is a modified starch produced by the esterification of the starch with dicarboxylic acids which can impart a hydrophobic character to starch (Agama-Avcevedo et al. *Current Opinion in Food Science*, Volume 13, February 2017, Pages 78-83). The octenyl succinyl groups in the OSA starch, as described in this invention, are preferably not more than 3 wt % (on an anhydrous basis), based on the weight of the starch. Commercial OSA starches are mainly produced from corn (waxy and normal), but have also been produced from other sources such as tapioca or potato. Preferably, the emulsifying OSA starch, as used in this invention, is produced from corn. Such a starch is for example commercially available as N-creamer46 (Ingredion), N-creamer 2230 (Ingredion) and C-Emtex (Cargill).

It may be preferred that OSA-modified starch and one or more other secondary emulsifiers can be present, although this is not needed for reasons of stability. It could be preferred that OSA-modified starch is the only oil-in-water emulsifier. The food composition could preferably comprise an oil-in-water emulsifier, wherein the oil-in-water emulsifier consists of OSA-modified starch.

The secondary emulsifier is preferably present in a total amount of from 0.2 to 6 wt %, more preferably of from 0.5 to 5 wt %, preferably of from 0.7 to 4 wt %, most preferably of from 0.8 to 3 wt %, based on the weight of the composition. OSA-modified starch is preferably present in an amount of from 0.3 to 4 wt %, more preferably of from 0.5 to 3.5 wt %, preferably of from 0.7 to 3.0 wt %, most preferably of from 0.8 to 2.5 wt %, based on the weight of the composition.

It is preferred that the secondary emulsifier is free from ingredients of animal origin. Examples of secondary emulsifiers that are not preferred in the context of the invention are egg yolk, caseinate, and whey protein, and the secondary emulsifier, preferably the composition, is preferably free of these emulsifiers. Preferably, the secondary emulsifier is free form egg, egg yolk or egg protein. It may be preferred that egg yolk is present in an amount of less than 3 wt % based on the composition. More preferably egg yolk is absent from the composition. Egg yolk may affect the stability of the composition of the present invention and is preferably not present.

Phospholipids

It was found, that the presence of phospholipids, at least specific types thereof, in the composition of the invention can have a negative effect on stability of the food composition of the present invention. Accordingly, it is desired that the total amount of phospholipids is as low as possible. The concentration of phospholipids is preferably less than 0.15 wt %, more preferably less than 0.1 wt %, even more preferably less than 0.07 wt %, most preferably less than 0.05 wt %, based on the weight of the composition. Most preferably, the composition is free from phospholipids. Phospholipids for the purpose of the invention are measured as the sum of the amounts of phosphatidic acid (PA), phosphatidylethanolamine (PE), phosphatidylcholine (PC), phosphatidylinositol (PI). The concentration of phosphatidylcholine (PC) is preferably less than 0.07 wt %, more preferably less than 0.05 wt %, even more preferably less than 0.03 wt % most preferably less than 0.02 wt %, based on the weight of the composition. It is preferred that the amount of phospholipids in the secondary emulsifier is less than 5 wt %, more preferably less than 3 wt %, even more preferably less than 2 wt %, even more preferably less than 1 wt %, based on the weight of the secondary emulsifier. It is preferred that the amount of phosphatidylcholine (PC) in the secondary emulsifier is less than 3 wt %, preferably less than 2 wt %, preferably less than 1 wt %, based on the weight of the secondary emulsifier. In this respect, the composition of the invention is preferably free of egg, egg yolk or egg protein. Preferably, the composition is free of egg yolk. A procedure to measure phospholipids in emulsions is for example described in the AOCS Official method Ja 7c-07: Lecithin Phospholipids by HPLC-ELSD.

Miscellaneous

The present invention preferably is a food product of the type of a mayonnaise or a salad dressing. This type of products preferably have relatively low pH. Accordingly, the pH of the composition is preferably less than 7, more preferably less than 5. Even more preferably the pH is in the range of 2-4.5, even more preferably in the range of 2.5-4.0, most preferably in the range of 2.8-4.0. It is preferred that the pH of the composition is below 5, preferably of below 4.

The composition of the invention may further comprise taste ingredients in both of the water phases (W1 and W2). Some of these taste ingredients, preferably salt, sugar and acidity regulators (e.g. organic acids, lemon juice etc) can influence the osmotic pressure of the water phases.

As is known to the skilled person, it is beneficial for the storage stability of a double emulsion if the osmolality of the W1 phase is equal or somewhat higher than in the W2 phase. Osmolality differences of, for example, about 200 mOsmol/kg were found to be preferable (G. Muschiolik, Multiple emulsions for food use, Current Opinion in Colloid & Interface Science, Volume 12, Issues 4-5, p 213-220, 2007). Therefore, it can be preferred that the osmolality of the W1 phase (the water that is part of the water-in-oil emulsion, W1/O) is equal or higher than that of the W2 phase (the continuous water phase), more preferably, the difference is, for example, more than 200 mOsmol/kg. The osmolality can be adjusted by the taste ingredients in each of the W1 and W2 phases.

The composition preferably comprises at least one or more taste ingredients (water soluble) from the group of salt, sugar, and acidity regulator, preferably the composition comprises salt, sugar, and acidity regulator.

The food composition of the invention preferably comprises one or more acidity regulators. Suitable acidity regulators according to the present invention preferably comprise, one or more acidity regulators selected from the group consisting of acetic acid, citric acid, malic acid, phosphoric acid, lactic acid and combinations thereof. More preferably, the composition comprises acetic acid, citric acid or a combination thereof. It is noted that acetic acid can be added in the form of, for instance, vinegar. Citric acid can be added in the form of, for example, lemon juice. The one or more acidity regulators are preferably present in the composition in a total concentration of from 0.05 to 3 wt %, more preferably of from 0.1 to 2 wt % by weight of the total food composition.

The food composition of the present invention preferably comprises salt. Salt can be any edible salt, preferably sodium chloride, potassium chloride or mixtures thereof. More preferably the salt comprises sodium chloride, most preferably is sodium chloride. The salt content of the food composition of the present invention is preferably in the range of from 0.2 to 10 wt %, more preferably of from 0.3 to 5 wt %, even more preferably from 0.5 to 4 wt % and most preferably of from 0.7 to 3 wt % by weight of food composition. Most preferably, sodium chloride is present in the range of from 0.2 to 10 wt %, more preferably of from 0.3 to 5 wt %, even more preferably from 0.5 to 4 wt % and most preferably of from 0.7 to 3 wt % by weight of the total food composition.

The composition of the invention preferably comprises sugars such as one or more monosaccharides and/or disaccharides. Preferred one or more monosaccharides and/or disaccharides include fructose, glucose, and sucrose. The concentration of one or more monosaccharides and/or disaccharides in the composition preferably ranges from 0.3 to 15 wt %, more preferably, from 0.5 to 12 wt %, even more preferably from 0.7 to 10 wt %, by weight of the total food composition.

It may be preferred that the food composition of the present invention may suitably contain flavouring materials, preservatives, colourings and/or anti-oxidants. Preferably it comprises flavouring materials selected from mustard, herbs, spices, natural and artificial flavorings and mixtures thereof.

It may be preferred that the food composition also contains flavoring and coloring materials which are oil soluble and therefore are comprised in the oil phase.

Other Parameters

Consistency

The consistency of the composition of the invention is preferably a consistency which is recognised by the consumer as the consistency of a mayonnaise, a sauce or of a salad dressing, preferably of a mayonnaise or a salad dressing, most preferably of a mayonnaise.

These compositions are viscoelastic materials that exhibit both viscous and elastic characteristics when undergoing deformation. Viscous and elastic behaviour of materials can be measured by various instruments, of which a state of the art rheometer is a suitable instrument for the present compositions. Viscous and elastic properties by rheometer can be obtained by various methods. Oscillation measurements are suitable to characterize the compositions described in the present invention. In oscillation measurements, the elastic property is commonly characterized by the storage modulus G' and the viscous property by the loss modulus G". Both moduli are only valid in the linear deformation area, as known in the art. The AR 2000 EX rheometer (TA-Instruments) is a suitable state of the art rheometer used for the analysis of the compositions of the present invention. A 4 cm steel plate geometry with 1 mm gap is a suitable geometry. Other instrument settings are known by skilled in the art operators. The consistency of the compositions of the present invention is described by their storage modulus G', measured at 1 Hz and 20° C., which is preferably within the range of 100-3500 Pa, more preferably in the range of 300-2000 Pa, most preferably in the range of 400-1500 Pa.

Another way to measure consistency in dressings products is by using "Brookfield viscosity" measurements. In this method, the resistance of a specified measuring spindle under specified conditions is translated to "Brookfield viscosity".

Measurement Protocol:
The equipment used is a 'Brookfield DV2TRV'
Temperature: room (20°-25° C.)
Measuring time: 30 sec
No spindle guardleg
Container: a beaker or jar with a diameter of approximately 60 mm and a height of approximately 65 mm Typical "Brookfield Viscosities" [in mPas] for Different Products:
Mayonnaise: 10000-30000 mPas (spindle #7)
Salad Dressings: 1500 to 6000 mPas (spindle #5)
Other Emulsified Dressings (e.g. frite saus): 8000 to 25000 mPas (spindle #7)

Oil Droplet Size

The oil droplet size can be measured using image analysis upon microscopic analysis, preferably by CSLM (confocal scanning light microscopy). Such droplet size is typical for industrially prepared emulsified food compositions. Homemade emulsified food compositions show a much larger oil droplet size. The size of the droplets can be suitably measured using an image analysis program such as e.g. Fiji. It is preferred that at least 90% of the water-in-oil emulsion droplets are below 25 µm, preferably below 22 µm, even more preferably below 20 µm, most preferably below 15 µm.

It is preferred that 90% of the water droplets within the oil droplets (W1 in O) have a diameter below 6 µm, preferably below 5 µm, even more preferably below 4 µm, most preferably below 3 µm.

In a preferred aspect, the composition relates to a composition in the form of a water-in-oil-in-water emulsion, the food composition comprising:
Water,
An oil phase comprising, based on the weight of the composition,
Vegetable oil, in an amount of 5 to 70 wt %, preferably 5 to 65 wt %,
Water-in-oil emulsifier consisting of fat crystals, in an amount of 0.1 to 6 wt %, preferably 0.2 to 3.5 wt %,
Oil-in-water emulsifier in an amount of from 0.5 to 3.5 wt % based on the weight of the food composition,
wherein the composition comprises less than 0.15 wt % of phospholipid, based on the weight of the composition,
wherein the composition comprises less than 0.2 wt % monoglycerides based on the weight of the oil phase,
wherein the composition comprises acetic acid, and
wherein the pH is from 2.5 to 4.

Method

Features set out in detail above in the context of the composition equally apply for the method, unless indicated otherwise. As has been indicated above, a prior art composition which does not rely on the presence of PGPR for its stability and which is efficient to prepare in terms of energy demand and process steps is not known to the inventors. The inventors believe that, the prior art process by the process of the present invention is simplified since no co-emulsifier such as monoglycerides are needed.

Accordingly, in a further aspect, the invention relates to a method to prepare a food composition according to the invention.

The process to manufacture the composition according to the invention comprises the steps of:
a) Providing an oil phase (O) comprising a water-in-oil-emulsifier consisting of fat crystals dispersed therein,
b) Combining the oil phase from step a) with water to form a primary water-in-oil emulsion (W1/O),
c) Combining the primary water-in-oil emulsion from step b) with a secondary water phase (W2) comprising water and oil-in-water emulsifier to form a water-in-oil-in-water emulsion (W1/O/W2).

As known by a skilled person, the slurries of fat crystals (i.e. the oil phase comprising vegetable oil and fat crystals) in vegetable oil from step a) can be produced by mixing hardstock fat with liquid vegetable oil at a temperature where all the hardstock fat is completely molten. This is followed by rapid cooling under shear, for example in a scraped surface heat exchanger. A suitable equipment for this purpose is for example a Votator A unit. For example, US005654029A teaches how slurries of fat crystals dispersed in vegetable oil can be produced by means of a Votator A unit in combination with a Votator C unit The oil phase preferably comprises less than 0.2 wt % of monoglycerides, preferably no monoglycerides are added to the oil. By the current process, the oil phase, comprising oil and fat crystals, is developed without being in contact with the water phase Hardstock fats suitable for producing the fat crystals in the oil phase, i.e the fat crystal slurry of step a) are e.g. hardened rapeseed oil, hardened sunflower seed oil, hardened soy bean oil such as B069, hardened palm oil such as P058, hardened cottonseed oil and mixtures of them. Most preferred is fully hardened rapeseed oil (RP70) or fully hardened high erucic rapeseed oil. Suitable liquid oils are for example vegetable oils such as sunflower seed oil, rapeseed oil, soybean oil, olive oil, cottonseed oil and mixtures thereof.

The hardstock fat can be added in an amount of 0.5-15 wt % fat in the oil phase, preferably 1 to 12 wt %, more preferably 2 to 10 wt %, even more preferably from 2.8 to 7 wt %, most preferably of from 3 to 6 wt %, based on the weight of the oil phase.

In step b) the primary water phase (W1) is emulsified in the oil phase, from step a) to from a primary water-in-oil emulsion (W1/O), also called primary water-in-oil emulsion (W1/O). This can be achieved by using typical emulsification equipment known to the skilled person. For example, mixers like a colloid mill or Silverson mixer, or homogenizers etc. can be used for this purpose.

In step c) the primary water-in-oil emulsion (W1/O) is added to a secondary water phase (W2), comprising water and oil-in water emulsifier, by means of a suitable emulsification equipment to form the water-in-oil-in-water emulsion (W1/O/W2) of the present invention. Suitable emulsification devices are for example colloid mills, Silverson mixer, homogenizer etc.

The resulting external, i.e. the continuous, water phase (W2), is preferably of from 20 to 95 wt %, more preferably of from 22 to 90 wt %, more preferably of from 25 to 85 wt %, more preferably of from 30 to 80 wt %, even more preferably of from 25 to 75 wt % and most preferably of from 25 to 60% based on the weight of the food composition. Water-in-oil emulsion (W1/O) is preferably added in an amount of from 5 to 78 wt %, more preferably of from 7 to 70 wt %, even more preferably of from 10 to 65 wt %, based on the weight of the resulting food composition.

The secondary emulsifier is added in an amount of preferably from 0.2 to 6 wt %, more preferably in an amount of from 0.5 to 5 wt %, more preferably in an amount of from 0.7 to 4 wt %, most preferably in an amount of from 0.8 to 3 wt % based on the weight of the resulting food composition.

As described in the context of the composition of the invention, taste providing ingredients can preferably be added to the water phases (W1 and/or W2), such as salt, sugar, or acidity regulator. As set out above, acidity regulator is preferably added in an amount of from 0.05 to 3 wt %, more preferably of from 0.1 to 2 wt % of the resulting food composition. The acidity regulator is preferably added as vinegar. The pH of the water phase (W1) is preferably adjusted to less than 5, more preferably of less than 4, more preferably of between 2 and 4.5, more preferably of between 2.5 and 4, most preferably between 2.8 and 4.

Salt may preferably be added, preferably sodium chloride, potassium chloride or mixtures thereof. More preferably salt comprises sodium chloride, most preferably is sodium chloride. Salt is preferably added in an amount of from 0.2 to 10 wt %, more preferably of from 0.3 to 5 wt %, even more preferably from 0.5 to 4 wt % and most preferably of from 0.7 to 3 wt % by weight of the resulting food composition. Most preferably, sodium chloride is added in the range of from 0.2 to 10 wt %, more preferably of from 0.3 to 5 wt %, even more preferably from 0.5 to 4 wt % and most preferably of from 0.7 to 3 wt % by weight of the resulting food composition.

Sugars are preferably added such as one or more monosaccharides and/or disaccharides. Preferred one or more monosaccharides and/or disaccharides include fructose, glucose, and sucrose. One or more monosaccharides and/or disaccharides are preferably added in an amount of from 0.3 to 15 wt %, more preferably, from 0.5 to 12 wt %, even more preferably from 0.7 to 10 wt %, by weight of the resulting food composition.

Salt, sugar and acidity regulator are preferably added to the water phase W1 (e.g. in step a) or W2 (e.g. in step b) or to both water phases. Preferably they are added to both the continuous water phase W2 and the internal water phase W1.

Advantage

The present invention enables the production of a water-in-oil-in-water composition which requires the use of fat crystals comprising triglycerides as water-in-oil emulsifier, while requiring no additional W/O emulsifiers. Compared to a prior art process, the process of the invention is more efficient in energy, machinery and ingredients.

The invention will now be exemplified by the following, non-limiting examples.

EXAMPLES

Ingredient List for the Examples:
Drinking Water: tap water
Vegetable oil: Sunflower oil or Soybean oil
Oil phase: vegetable oil with 6 wt % fat crystals RPh70 (Fully refined, fully hydrogenated, high erucic rapeseed oil)
PGPR (GRINDSTED® PGPR 90, Danisco, Denmark)
Egg yolk (Bouwhuis Enthoven, the Netherlands)
Osmolytes: mix of sugar, salt and vinegar
   Sugar: Sucrose
   Salt: sodium Chloride
   Vinegar, white distilled (12 wt % acetic acid)

Example 1: Fat Crystals and Oil Phase Production

For the following examples an oil phase comprising RPh70 fat crystals was used. RPh70 is rapeseed oil hardened to a slip melting point of 70° C. Process to produce is described for example in U.S. Ser. No. 08/424,422. This process is known by a person skilled in the art. In the following examples an oil phase with 6% of RPh70 was used. The process to produce the oil phase consisted of melting and dissolving the hardstock into the liquid vegetable oil at a temperature where all solid fat dissolved (above 70° C.) and cooling under controlled shear condition in a votator.

Example 2: Single and Double Emulsions Process Conditions

All examples were prepared according to the following steps

Single Emulsion
   Mixture (a) was prepared by adding osmolytes (except for the vinegar) and secondary emulsifier (OSA starch or otherwise specified) to water and mixing it until completely dissolved using a Silverson mixer without a grid, speed 2000 rpm for 10-15 minutes until dissolved
   Oil was slowly added to Mixture (a) using the Silverson at 4000 rpm (Mixture (b)).
   When all oil was added, speed was increased to 8000 rpm and mixed for 4 min
   After that, speed was reduced to 4000 rpm and vinegar was added and mixed further for 2 minutes at 4000 rpm.

Double Emulsion: W1-O1-W2
a) W1-O Preparation
   Mixture (a) was prepared by adding osmolytes to water and mixing it.
   Mixture (a) was slowly added to the crystallized fat slurry Mixture (b) and emulsified using a Silverson L5M-A high shear mixer, equipped with a general purpose disintegrating head, operating at 8000 rpm while mixing.
   When all Mixture (a) was fully incorporated to Mixture (b), the mixture was further homogenized for long enough to have a homogeneous emulsion. (Mixture (c))
   For comparative examples, alternative primary emulsifiers were used in combination with oil instead of crystallized fat (mixture (b).

b) W1-O-W2
   Mixture (d) was prepared by adding osmolytes (except for the vinegar) and emulsifier (OSA starch or otherwise specified) to water and mixing it until completely dissolved using a Silverson mixer without a grid, speed 2000 rpm for 10-15 minutes until dissolved (mixture (d))

Mixture (c) was slowly added to Mixture (d) and emulsified using a high shear mixer using Bench Silverson (General purpose disintegrating head) at 6500 rpm while mixing).

When all Mixture (c) was added, vinegar was added and mixed further for 2 minutes at 6500 rpm to obtain Mixture (f).

Example 3

Oil reduction in a dressing product using fat crystals as primary emulsifier in combination with an OSA starch as secondary emulsifier.

|  | Example 3a Ex) (Comp. Example) % wt of total | Example 3b (invention) % wt of total formulation |
|---|---|---|
| Water in W1 | 0 | 25.9 |
| Osmolytes in W1 | 0 | 4.1 |
| Fat crystals (RPh70) | 0 | 2.7 |
| Vegetable oil | 75.0 | 42.3 |
| Water in W2 | 19.3 | 19.3 |
| OSA starch (N-creamer 2230, | 0.6 | 0.6 |
| Osmolytes in W2 | 5.1 | 5.1 |
| Total | 100 | 100 |
| G' (Pa), after 1 week | 1133 | 1289 |
| Appearance | Glossy and smooth | Glossy and smooth |

Examples 3a and 3b were produced as described in example 2.

By using fat crystals (example 3b) to prepare a primary emulsion (W1-O), in combination with use of OSA starch as secondary emulsifier, oil was reduced from 75 to 45% while maintaining the quality of the product, as reflected in a similar G' and appearance. The product described in example 3b was stable for several months.

Example 4

Oil reduction in a dressing product using fat crystals as primary emulsifier in combination with an OSA starch as secondary emulsifier as compared to typical W/O emulsifier PGPR.

|  | Example 4a (comp. ex) | Example 4b (this invention) |
|---|---|---|
| Water in W1 | 32.1 | 26.1 |
| Osmolytes in W1 | 5.2 | 4.1 |
| Fat crystals (RPh70) | 0 | 2.7 |
| PGPR | 0.9 | 0 |
| Vegetable oil | 37.0 | 42.3 |
| Water in W2 | 19.1 | 19.1 |
| OSA starch (N-creamer 46, | 0.6 | 0.6 |
| Osmolytes in W2 | 5.1 | 5.1 |
| Total | 100 | 100 |
| G' (Pa), after 1 week | 212 | 1212 |
| Appearance | Unstable, | Glossy and smooth |

Examples 4a and 4b were produced as described in example 2.

Product made with PGPR in combination with OSA starch (4a) was unstable and its texture not suitable for a mayonnaise-type product. Using fat crystals (example 4b) to prepare the primary emulsion (W1-O) instead of PGPR as primary emulsifier resulted in a firmer texture, suitable for a mayonnaise-type product. In this context, fat crystals appeared a much more efficient emulsifier than PGPR.

Example 5: Lower Oil Dressing Product Using Fat Crystals as Primary Emulsifier in Combination with a Pea Flour as Secondary Emulsifier

|  | Example 5 Pea flour as secondary emulsifier |
|---|---|
| Water in W1 | 13.0 |
| Osmolytes in W1** | 1.0 |
| Fat crystals (RPh70) | 1.6 |
| Vegetable oil | 24.4 |
| Water in W2 | 48.0 |
| Pea flour | 2.0 |
| Thickeners in W2* | 3.3 |
| Osmolytes in W2** | 6.7 |
| Total | 100 |
| G' (Pa), after 6 weeks | 1555 |

*Xanthan and Modified starch (colflo67)
**Osmolytes are Sodium chloride, Vinegar and Sucrose. Final product had a pH of 3.3.

Example 5 was produced as described in example 2.

The combination of fat crystals as primary emulsifier and pea flour as secondary emulsifier produced a stable double emulsion. The amount of phospholipids in the secondary emulsifier was <0.7 wt %, based on the weight of the secondary emulsifier (pea flour)

The invention claimed is:

1. A food composition in the form of a water-in-oil-in-water emulsion, the food composition comprising:
   Water,
   Oil phase comprising:
   Vegetable oil,
   Water-in-oil emulsifier consisting of fat crystals, wherein the fat crystals are present in an amount of from 0.5 to 15 wt %, based on the weight of the oil phase, and the fat crystals are fat that are triglycerides or mixtures of triglycerides that crystalize at a temperature of between 58 and 72° C.,
   wherein the oil phase is present in an amount of from 5 to 76 wt %, based on the weight of the composition,
   Oil-in-water emulsifier, in an amount of from 0.2 to 6 wt %, based on the weight of the food composition, wherein the oil-in-water emulsifier comprises less than 5% phospholipid based on total weight of the oil-in-water emulsifier,
   wherein the composition comprises less than 0.2 wt % monoglycerides based on the oil phase, and
   wherein the composition is free of polyglycerol polyricinoleate.

2. The food composition according to claim 1, wherein phospholipids are present in an amount of less than 0.15 wt % based on the weight of the food composition.

3. The food composition according to claim 1, wherein the oil-in-water emulsifier is selected from the group consisting of octenyl succinic anhydride (OSA)-modified starch, legume flour, whey protein, plant protein and mixtures thereof.

4. The food composition according to claim 1, wherein the oil-in-water emulsifier comprises octenyl succinic anhydride (OSA)-modified starch.

5. The food composition according to claim 1, wherein the oil-in-water emulsifier is present in an amount of from 0.5 to 5 wt % based on the weight of the food composition.

6. The food composition according to claim 1, wherein the oil phase is present in an amount of from 8 to 69 wt %, based on the weight of the composition.

7. The food composition according to claim 1, wherein the fat crystals are present in an amount of from 1 to 12 wt % based on the weight of the oil phase.

8. The food composition according to claim 1, wherein the water content contained within the oil phase is present in an amount of more than 25 wt % based on the weight of the primary emulsion (W1/O).

9. The food composition according to claim 1, wherein the food composition is an emulsified sauce.

10. The food composition according to claim 1, wherein the composition is free of egg yolk.

11. The food composition according to claim 1, wherein the average crystal thickness is less than 100 nm.

12. The food composition according to claim 1, wherein the pH is less than 4.

13. The food composition according to claim 1, wherein the composition further comprises acetic acid, sugar, salt or mixture thereof.

14. A process to manufacture the composition according to claim 1, the process comprising the steps of:
   a) Providing an oil phase (O) comprising vegetable oil and a water-in-oil emulsifier consisting of fat crystals dispersed therein, wherein fat crystals are fat that are triglycerides or mixtures of triglycerides that crystalize at a temperature of between 58 and 72° C.,
   b) Combining the oil phase from step a) with water to form a primary water-in-oil emulsion (W1/O),
   c) Combining the primary water-in-oil emulsion from step b) with a secondary water phase (W2) comprising water and oil-in-water emulsifier to form a water-in-oil-in-water emulsion (W1/O/W2), wherein the oil-in-water emulsifier comprises less than 5% phospholipid based on total weight of the oil-in-water emulsifier.

15. The food composition according to claim 9, wherein the food composition is an emulsified sauce of the mayonnaise type.

* * * * *